(12) United States Patent
Ni et al.

(10) Patent No.: US 11,570,334 B2
(45) Date of Patent: Jan. 31, 2023

(54) LENS DRIVING DEVICE

(71) Applicant: Changzhou AAC Raytech Optronics Co., Ltd., Changzhou (CN)

(72) Inventors: Tianheng Ni, Shenzhen (CN); Feng Yan, Shenzhen (CN); Suohe Wei, Shenzhen (CN)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 0 days.

(21) Appl. No.: 17/533,080

(22) Filed: Nov. 22, 2021

(65) Prior Publication Data
US 2022/0182512 A1 Jun. 9, 2022

(30) Foreign Application Priority Data
Dec. 8, 2020 (CN) .......................... 202022916311.6

(51) Int. Cl.
*H04N 5/225* (2006.01)
*G03B 5/00* (2021.01)

(52) U.S. Cl.
CPC ............. *H04N 5/2252* (2013.01); *G03B 5/00* (2013.01); *H04N 5/2254* (2013.01); *G03B 2205/0053* (2013.01)

(58) Field of Classification Search
CPC .... G03B 2205/0023; G03B 2205/0053; G03B 2205/0076; G03B 3/10; G03B 5/00; G03B 5/06; H04N 5/2252; H04N 5/2253; H04N 5/2254
See application file for complete search history.

(56) References Cited

U.S. PATENT DOCUMENTS

| | | | |
|---|---|---|---|
| 2014/0139695 A1* | 5/2014 | Kawai | G03B 5/00 348/208.99 |
| 2018/0095341 A1* | 4/2018 | Lee | H04N 5/2257 |
| 2019/0230262 A1* | 7/2019 | Wang | G03B 9/06 |
| 2020/0073200 A1* | 3/2020 | Eom | G02B 27/646 |
| 2020/0379239 A1* | 12/2020 | Li | G02B 23/08 |

* cited by examiner

*Primary Examiner* — Amy R Hsu
(74) *Attorney, Agent, or Firm* — W&G Law Group (57) ABSTRACT

A lens driving device includes a fixing bracket; first and second support frames; a rotation assembly including first and second rolling balls so that the fixing bracket and the first support frame are spaced apart from each other and form a rotational connection about a first direction, and the first and second support frames are spaced apart from each other and form a rotational connection about a second direction; a driving assembly for driving the fixing bracket to rotate relative to the first and second support frames about the first direction and for driving the first support frame to rotate relative to the second support frame about the second direction; a flexible circuit board; and first and second elastic support components. The lens driving device reduces the height of the overall structure, and effectively reduces the height of the lens driving device.

14 Claims, 7 Drawing Sheets

LENS DRIVING DEVICE

TECHNICAL FIELD

The present disclosure relates to a driving device, and in particular, to a lens driving device.

BACKGROUND

With the development of photographing technology, lens driving devices have been widely used in various photographing apparatus. Consumers are fond of combining lens drive devices with various portable electronic devices such as mobile phones, cameras, computers, etc.

In the fixing bracket, the first support frame and the second support frame of the lens in the related art, the rational connection between the fixing bracket and the first support frame is achieved through rotation shafts when the fixing bracket rotates relative to the first support frame about a first direction perpendicular to the optical axis. Further, the rational connection between the first support frame and the second support frame are also achieved through rotation shafts when the first support frame rotates relative to the second support frame about a second direction perpendicular to the optical axis. The first direction and the second direction are respectively parallel to two diagonal lines of the fixing bracket. This rotational connection structure may increase the size change in the height direction of the lens module during the rotation. Accordingly, the requirement for the height direction of the overall structure is greatly increased, thereby causing the height of the lens driving device to be too high.

Therefore, it is necessary to provide a lens driving device to solve the above problems.

SUMMARY

The technical problem to be solved by the present disclosure is to provide a lens driving device, which reduces the size change in the height direction during the rotation of the lens module.

In order to solve the above technical problems, the present disclosure provides a lens driving device. The lens driving device includes: a fixing bracket having a rectangular structure with a receiving space, the receiving space being configured to install a lens module; a first support frame having a rectangular structure and sleeved on an outer periphery of the fixing bracket, the first support frame being spaced apart from the fixing bracket; a second support frame having a rectangular structure and sleeved on an outer periphery of the first support frame, the second support frame being spaced apart from the first support frame; a rotation assembly including at least one first rolling ball and at least one second rolling ball; a driving assembly including at least two shape memory wires; a flexible circuit board electrically connected to the at least two shape memory wires; at least one first elastic support component configured to elastically connect the fixing bracket with the first support frame and providing a rotation restoring force for the fixing bracket to rotate relative to the first support frame about a first direction; and at least one second elastic support component configured to elastically connect the first support frame with the second support frame and providing a rotation restoring force for the first support frame to rotate relative to the second support frame about a second direction. The at least one first sliding groove is provided at a bottom surface of the fixing bracket and formed at a corner of the fixing bracket, at least one second sliding groove is provided at a top surface of the first support frame, at least one third sliding groove is provided at a bottom surface of the first support frame, the at least one second sliding groove and the at least one third sliding groove are respectively formed at two adjacent corners of the first support frame, and at least one fourth sliding groove is provided at a top surface of the second support frame and formed at a corner of the second support frame. Each of the at least one first rolling ball is clamped in one of the at least one first sliding groove and one of the at least one second sliding groove that are opposite to each other, in such a manner that the fixing bracket and the first support frame are spaced apart from each other and are rotatably connected to each other around the first direction. Each of the at least one second rolling ball is clamped in one of the at least one third sliding groove and one of the at least one fourth sliding groove that are opposite to each other, in such a manner that the first support frame and the second support frame are spaced apart from each other and are rotatably connected to each other around the second direction, wherein the first direction and the second direction are both perpendicular to an optical axis of the lens module, and are parallel to two diagonal directions of the fixing bracket. One of the at least two shape memory wires is connected between the second support frame and the fixing bracket, and is configured to drive the fixing bracket to rotate relative to the first support frame and the second support frame about the first direction. Another one of the at least two shape memory wires is connected between the second support frame and the first support frame, and is configured to drive the first support frame to rotate relative to the second support frame about the second direction.

As an improvement, each of the at least one first sliding groove and the at least one second sliding groove is a V-shaped structural groove.

As an improvement, each of the at least one third sliding groove and the at least one fourth sliding groove is a V-shaped structural groove.

As an improvement, the at least one first rolling ball includes two first rolling balls; the at least one first sliding groove includes two first sliding grooves that are respectively formed at one pair of diagonal positions of the bottom surface of the fixing bracket; and the at least one second sliding groove includes two second sliding grooves that are respectively formed at one pair of diagonal positions of the top surface of the first support frame.

As an improvement, the fixing bracket includes a sidewall surrounding the lens module and two support walls extending outwards from the sidewall, wherein the two support walls are respectively formed at one pair of diagonal positions of the sidewall, and the two first sliding grooves are formed at bottom surfaces of the two support walls, respectively. The first support frame is provided with two first avoidance grooves, wherein the two first avoidance grooves are respectively formed at one pair of diagonal positions of the first support frame, and the two second sliding grooves are formed at bottoms of the two first avoidances grooves, respectively. The two support walls extend into the two first avoidance grooves, respectively.

As an improvement, the at least one second rolling ball includes two second rolling balls. The at least one third sliding groove includes two third sliding grooves that are respectively formed at another pair of diagonal positions of the bottom surface of the first support frame. The at least one fourth sliding groove includes two fourth sliding grooves that are respectively formed at another pair of diagonal positions of the top surface of the second support frame.

As an improvement, the first support frame includes a first sidewall surrounding the fixing bracket, and two first support walls extending outwards from the first sidewall, wherein the two first support walls are formed at another pair of diagonal positions of the first sidewall, respectively. The two third sliding grooves are formed at bottom surfaces of the two first support walls, respectively. The second support frame is provided with two second avoidance grooves that are respectively formed at one pair of diagonal positions of the second support frame, and the two fourth sliding grooves are formed at bottoms of the two second avoidance grooves. The two first support walls extend into the two second avoidance grooves, respectively.

As an improvement, the at least one first elastic support component includes two first elastic support components that are spaced apart from each other in the first direction, wherein the two first elastic support components are respectively disposed at one pair of diagonal positions of the first support frame, and each of the two first elastic support components has a planar elastic sheet structure perpendicular to the optical axis.

As an improvement, each of the two first elastic support components includes a first fixed arm fixed at a corner of the fixing bracket, two second fixed arms respectively fixed to two adjacent sides of the first support frame, and two first elastic arms respectively configured to connect the two second fixed arms with the first fixed arm.

As an improvement, the at least one second elastic support component includes two second elastic support components that are spaced apart from each other in the second direction, wherein the two second elastic support components are respectively disposed at another pair of diagonal positions of the first support frame, and each of the two second elastic support components has a planar elastic sheet structure perpendicular to the optical axis.

As an improvement, each of the two second elastic support components includes a third fixed arm fixed at a corner of the first support frame, two fourth fixed arms respectively fixed to two adjacent sides of the second support frame, and two second elastic arms respectively configured to connect the two fourth fixed arms with the third fixed arm.

As an improvement, the lens driving device further includes a shell covering the second support frame.

In the lens driving device of the present disclosure, the first sliding groove is disposed at the corner of the bottom surface of the fixing bracket, the second sliding groove is disposed at the corner of the top surface of the first support frame, the third sliding groove is disposed at the corner of the bottom surface of the first support frame, and the fourth sliding groove is provided at the corner of the top surface of the second support frame. The first rolling ball of the rotation assembly is clamped in the first sliding groove and the second sliding groove, which are opposite to each other. Compared with the related art, the fixing bracket and the first support frame in the present disclosure are spaced apart from each other, and are rotatably connected around the first direction. The second rolling ball of the rotation assembly is clamped in the third sliding groove and the fourth sliding groove so that the first support frame and the second support frame are spaced apart from each other and rotatably connected around the second direction. In this way, a floating rotational connection of double-layer nested rolling balls is formed among the fixing bracket, the first support frame, and the second support frame, thereby reducing the size change in the height direction during the rotation of the lens module. Accordingly, the requirement in the height direction of the overall structure is also reduced, and the height of the lens driving device is greatly reduced.

BRIEF DESCRIPTION OF DRAWINGS

In order to more clearly describe the technical solutions in the embodiments of the present disclosure, the following will briefly describe the drawings used in the description of the embodiments. The drawings in the following description merely illustrate some embodiments of the present disclosure. Those skilled in the art may obtain other drawings without involving inventive steps based on these drawings. In the drawings.

DESCRIPTION OF REFERENCE NUMERALS 1. fixing bracket; 11. sidewall; 12. support wall; 13. first sliding groove;

2. first support frame; 21. first sidewall; 22. first avoidance groove; 23. second sliding groove; 24. first support wall; 25. third sliding groove;

3. second support frame; 31. second sidewall; 32. second avoidance groove; 33. fourth sliding groove;

4. rotation component; 41. first rolling ball; 42. second rolling ball;

5. driving assembly; 51. shape memory wire; 52. first wire hooking portion; 53.

second wire hooking portion; 54. third wire hooking portion;

6. flexible circuit board;

7. first elastic support component; 71. first fixed arm; 72. second fixed arm; 73. first elastic arm;

8. second elastic support component; 81. third fixed arm; 82. fourth fixed arm; 83. second elastic arm;

9. lens module;

10. shell.

DESCRIPTION OF EMBODIMENTS

The following will clearly and completely describe the technical solutions in the embodiments of the present disclosure in conjunction with the drawings. The described embodiments are merely some of, rather than all of the embodiments of the present disclosure. Examples. Based on the embodiments of the present disclosure, all other embodiments obtained by those skilled in the art according to the principle of the present disclosure shall fall within the scope of the present disclosure.

Figure 1:
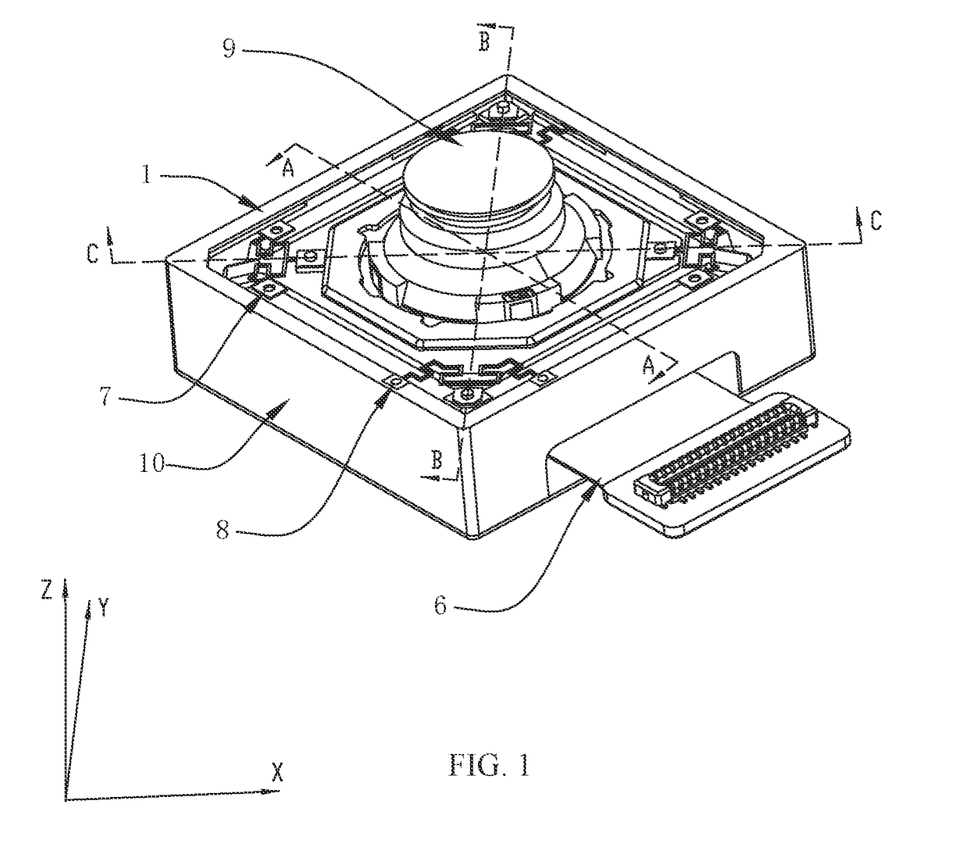
FIG. 1 is a schematic respective view showing a structure of a lens driving device of the present disclosure.
Figure 2:
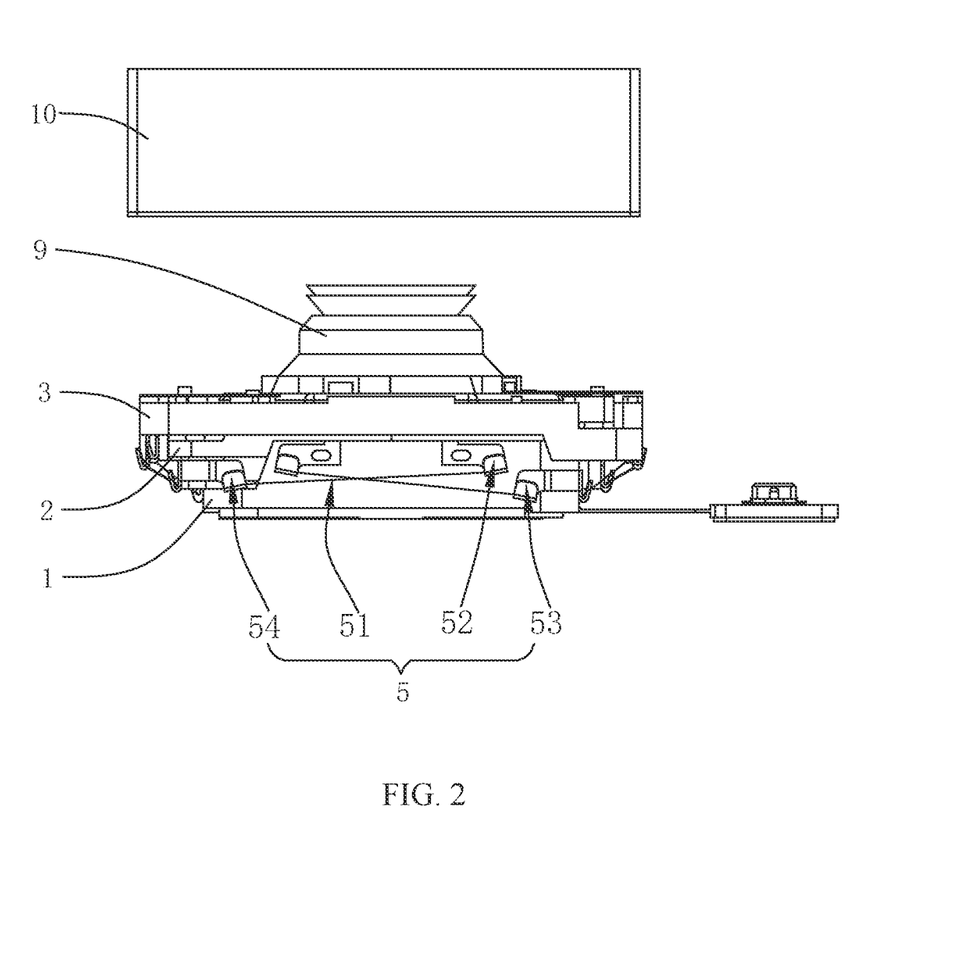
FIG. 2 is a schematic exploded view showing a partial structure of a lens driving device of the present disclosure.
Figure 3:
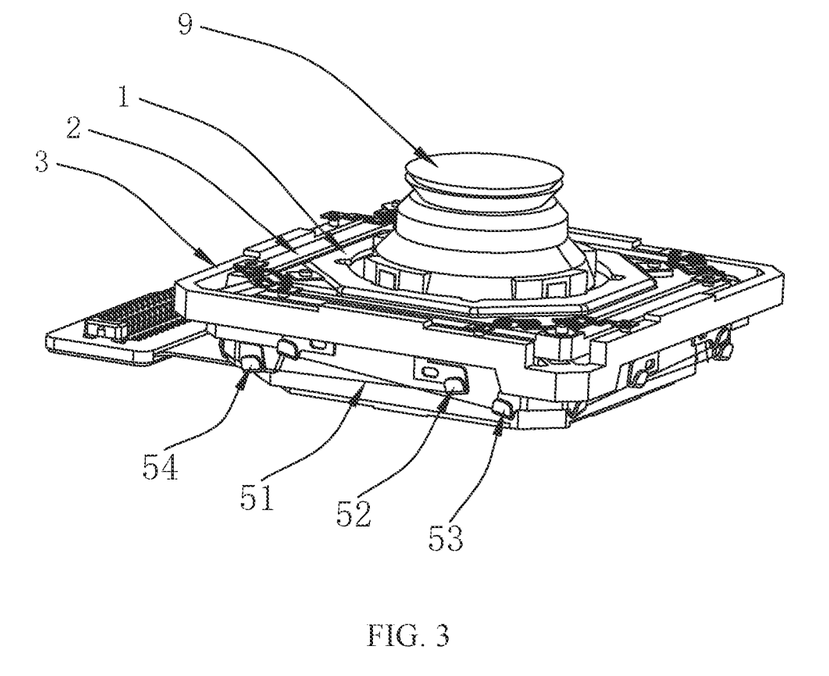
FIG. 3 is a schematic partial structural diagram of a lens driving device of the present disclosure, in which a shell is removed.
Figure 4:
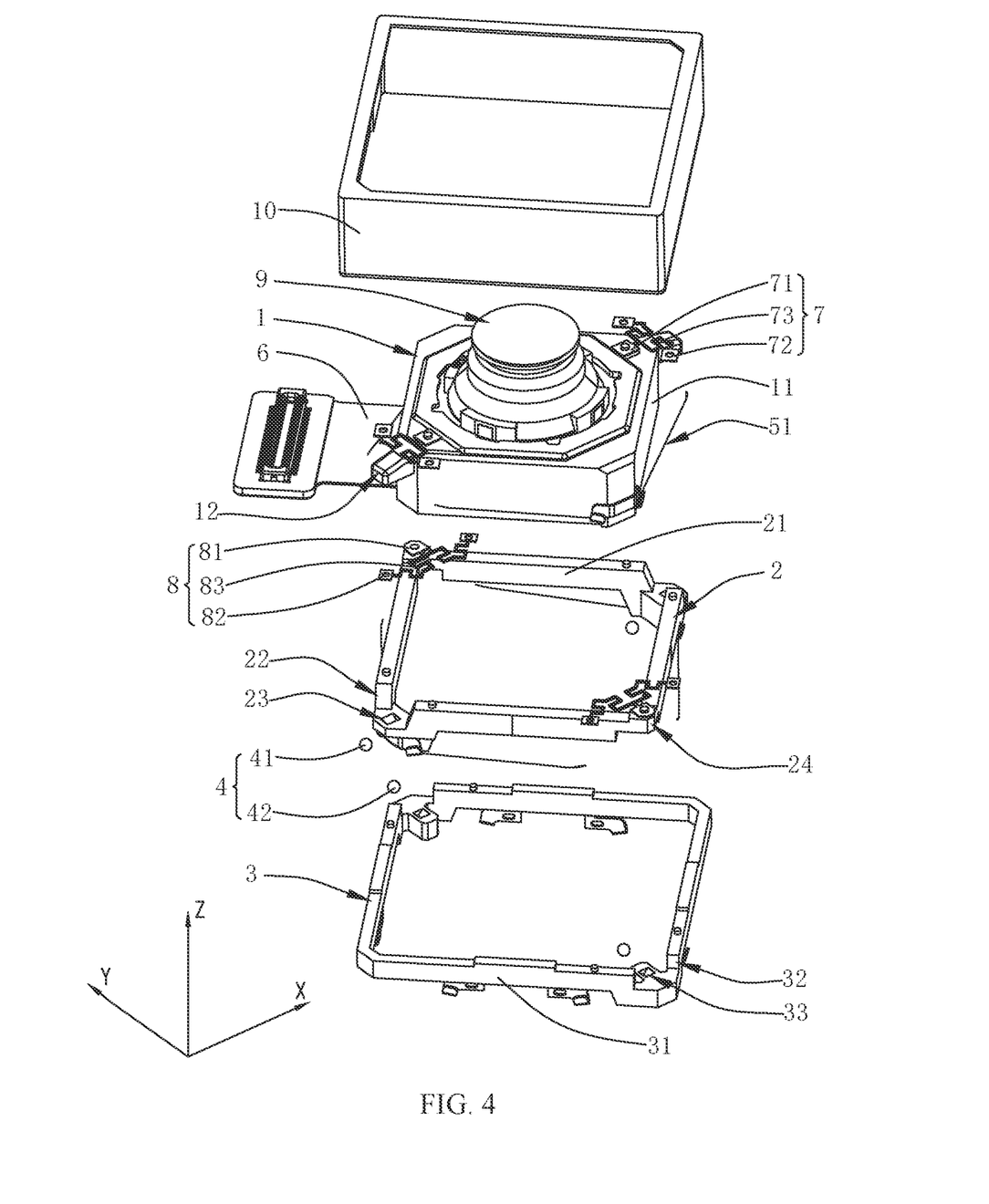
FIG. 4 is another schematic exploded diagram showing a partial structure of a lens driving device of the present disclosure.
Figure 5:
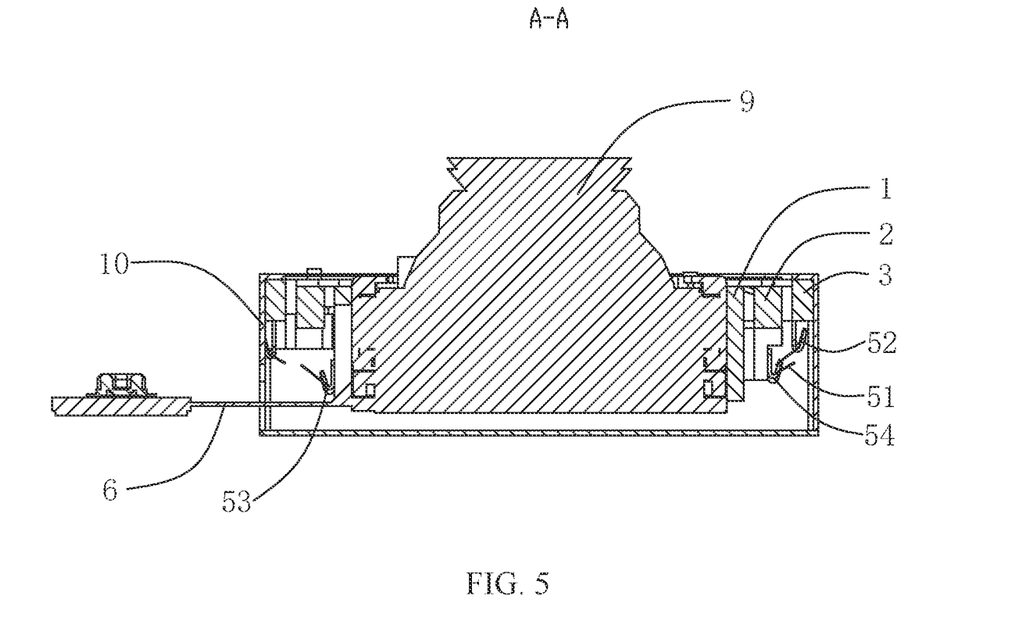
FIG. 5 is a cross-sectional view along line A-A shown in FIG. 1.
Figure 6:
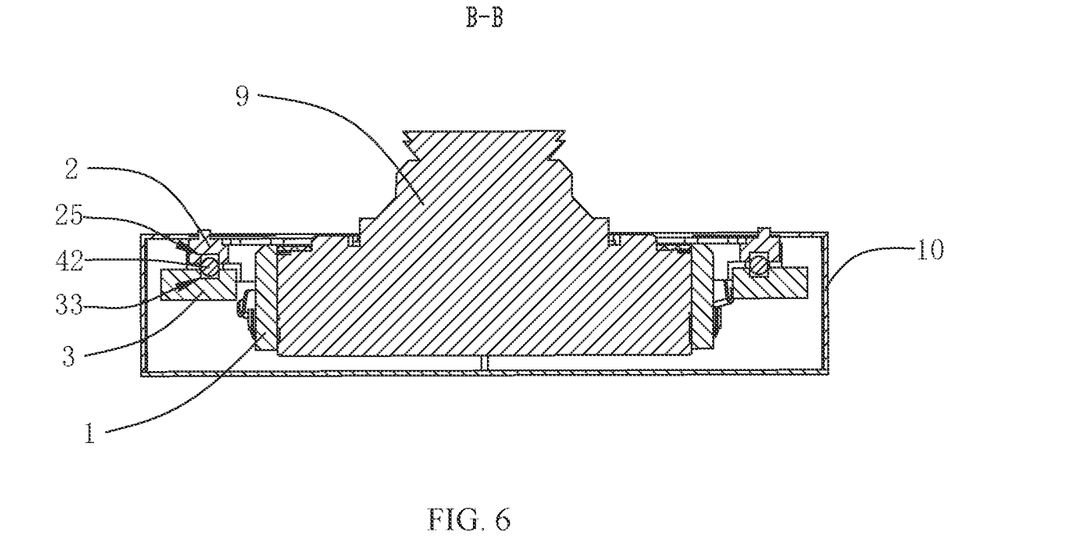
FIG. 6 is a cross-sectional view along line B-B shown in FIG. 1.
Figure 7:
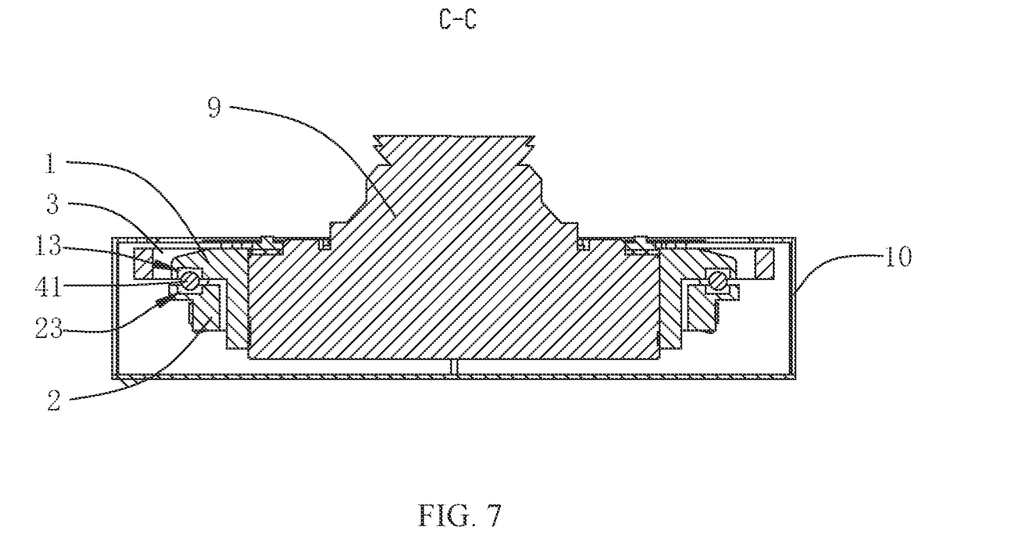
FIG. 7 is a cross-sectional view along line C-C shown in FIG. 1.

Some embodiments of the present disclosure provide a lens driving device. As shown in FIG. 1 to FIG. 7, the lens driving device includes a fixing bracket 1, a first support frame 2, a second support frame 3, a rotation assembly 4, a driving assembly 5, a flexible circuit board 6, first elastic support components 7, and second elastic support components 8.

The fixing bracket 1 encloses a rectangular structure with a receiving space, which is used to install a lens module 9.

Two first sliding grooves 13 are formed on a bottom surface of the fixing bracket 1, and are formed at one pair of diagonal positions of the bottom surface of the fixing bracket 1, respectively.

The first support frame 2 defines a rectangular structure. The first support frame 2 is sleeved on an outer periphery of the fixing bracket 1, and is spaced apart from the fixing bracket 1.

Two second sliding grooves 23 are formed on a top surface of the first support frame 2, and two third sliding grooves 25 are formed on a bottom surface of the first support frame 2. The two second sliding grooves 23 are respectively formed at the one pair of diagonal positions of the top surface of the first support frame 2, and the two third sliding grooves 25 are respectively formed at another pair of diagonal positions of the bottom surface of the first support frame 2.

The second support frame 3 has a rectangular structure. The second support frame 3 is sleeved on an outer periphery of the first support frame 2, and is spaced apart from the first support frame 2.

Two fourth sliding grooves 33 are provided on a top surface of the second support frame 3, and are respectively formed at the another pair of diagonal positions of the top surface of the second supporting frame 3.

In an embodiment, the rotation assembly 4 includes two first rolling balls 41 and two second rolling balls 42. Each of the two first rolling balls 41 is clamped in one of the first sliding grooves 13 and one of the second sliding grooves 23, and the one first sliding groove and the one second sliding groove are opposite to each other. In this way, the fixing bracket 1 and the first support frame 2 are spaced apart from each other, and are rotatably connected to each other around a first direction. Each of the two second rolling balls 42 is clamped in one of the third sliding grooves 25 and one of the fourth sliding grooves 33, and the one third sliding groove and the one fourth sliding groove are opposite to each other. In this way, the first support frame 2 and the second support frame 3 are spaced apart from each other, and are rotatably connected to each other around a second direction.

In an embodiment, the first direction and the second direction are perpendicular to an optical axis of the lens module 9, and are respectively parallel to the two diagonal directions of the fixing bracket 1.

In this embodiment, the first direction is defined as an X direction, the second direction is defined as a Y direction, and the optical axis of the lens module 9 is defined as a Z direction. The first direction and the second direction are perpendicular to each other.

In an embodiment, the fixing bracket 1 includes a sidewall 11 surrounding the lens module 9, and two support walls 12 extending outwards from the sidewall 11. The two support walls 12 are formed on the sidewall 11 at the one pair of diagonal positions, respectively. The two first sliding grooves 13 are formed at bottom surfaces of the two support walls 12, respectively. The first support frame 2 is provided with two first avoidance grooves 22 that are respectively formed at the one pair of diagonal positions of the first support frame 2, and the two second sliding grooves 23 are respectively formed at bottoms of the two first avoidance grooves 22. Each of the two support walls 12 extends into one of the first avoidance grooves 22.

The support walls 12 extending outwards are disposed on the sidewall 11, and the first avoidance grooves 22 are disposed on the first support frame 2. In this way, heights of the first sliding grooves 13 and the second sliding grooves 23 relative to the horizontal plane are reduced while ensuring that the first sliding grooves 13 are in a one-to-one correspondence with the second sliding grooves 23, thereby reducing a height of the overall structure of the lens driving device.

In an embodiment, the first support frame 2 includes a first sidewall 21 surrounding the fixing bracket 1, and two first support walls 24 extending outwards from the first sidewall 21. The two first support walls 24 are respectively formed at another pair of diagonal positions of the first sidewall 21, and the two third sliding grooves 25 are respectively formed on bottom surfaces of the two first support walls 24. The second support frame 3 is provided with two second avoidance grooves 32 that are respectively formed at the another pair of diagonal positions of the second support frame 3, and the two fourth sliding grooves 33 are respectively formed at the bottoms of the two second avoidance grooves 32. Each of the first support walls 24 extends into one of the second avoidance grooves 32.

In an embodiment, the second support frame 3 includes a second sidewall 31 surrounding the first support frame 2, and the two second avoidance grooves 32 are respectively formed at the another pair of diagonal positions of a top surface of the second sidewall 31.

The first support walls 24 extending outward are disposed on the first sidewall 21, and the second avoidance grooves 32 are disposed on the second support frame 3. In this way, heights of the third sliding grooves 25 and the fourth sliding grooves 33 relative to the horizontal plane are reduced while ensuring that the third sliding grooves 25 are in a one-to-one correspondence with the fourth sliding grooves 33, thereby reducing the height of the overall structure of the lens driving device.

In an embodiment, the first sliding grooves 13 and the second sliding grooves 23 are V-shaped structural grooves, so that groove walls on both sides of the grooves can limit the degree of freedom of the rolling balls in other directions to avoid the position shift of the fixing bracket 1 during the rotation.

In an embodiment, the third sliding grooves 25 and the fourth sliding grooves 33 are V-shaped structural grooves. In this way, groove walls on both sides of the grooves can limit the degree of freedom of the rolling balls in other directions to avoid the position shift of the first support frame 2 during the rotation.

In an embodiment, the driving assembly 5 is configured to drive the fixing bracket 1 to rotate relative to the first support frame 2 and the second support frame 3 about the first direction, and to drive the first support frame 2 to rotate relative to the second support frame 3 about the second direction. When the fixing bracket 1 rotates relative to the first support frame 2 about the first direction, the lens module 9 is driven to rotate about the first direction. When the first support frame 2 rotates relative to the second support frame 3 about the second direction, the lens module 9 is driven to rotate about the second direction.

In an embodiment, the driving assembly 5 includes at least two shape memory wires 51, each of which has a fixed end and a driving end. The fixed ends of the at least two shape memory wires 51 are connected to the second sidewall 31 of the second support frame 3 and are spaced apart from each other. The driving end of one of the at least two shape memory wires 51 is connected to the fixing bracket 1 at an angle with respect to the horizontal plane to drive the fixing bracket 1 to rotate relative to the first support frame 2 and the second support frame 3 about the first direction. The driving end of another one of the at least two shape memory wires 51 is connected to the first support frame 2 at an angle with respect to the horizontal plane to drive the first support frame 2 to rotate relative to the second support frame 3 about the second direction. In this way, the spacing between every adjacent two of the intersecting portions of the shape memory lines 51 is increased so that the shape memory lines have enough space for the movement, thereby avoiding the shape memory lines 51 from being interfered with each other during the movement.

When the shape memory wires 51 are energized, the shape memory wires 51 contract to generate pulling forces, so that the fixing bracket 1 is pulled to rotate relative to the first support frame 2 about the first direction, or the first support frame 2 is pulled to rotate relative to the second support frame 3 about the second direction.

In an embodiment, the angle between the horizontal plane and each of the shape memory lines 51 is not equal to 90°.

In an embodiment, the driving assembly 5 includes eight shape memory wires 51, every two shape memory wires 51 of which form a group. The fixed ends of the two shape memory wires 51 in the same group are respectively connected to one side of the second support frame 3, and are spaced apart from each other. The driving end of one of the two shape memory wires 51 in the same group is connected to one side of the fixing bracket 1, and the driving end of the other of the two shape memory wires 51 is connected to one side of the first support frame 2. The two shape memory wires 51 in the same group intersect each other, one of the two shape memory wires is configured to connect the second support frame 3 with the fixing bracket 1, and the other of the two shape memory wires is configured to connect the second support frame 3 with the first support frame 2.

In an embodiment, the fixed end of each of the shape memory wires 51 is connected to the second support frame 3 through a first wire hooking portion 52, the driving end of the shape memory wire 51 connected to the fixing bracket 1 is connected to the fixing bracket 1 through a second wire hooking portion 53, and the driving end of the shape memory wire 51 connected to the first support frame 2 is connected to the first support frame 2 through a third hooking portion 54. Accordingly, the two ends of the shape memory wire 51 can be easily connected, and the stability after the connection is improved.

In some embodiments, the drive assembly 5 can drive the fixing bracket 1 and the first support frame 2 through magnets and coils that are match to each other. The magnets are disposed on the sidewall 11 of the fixing frame 1 and the first support frame 2, and then the coils are disposed at positions corresponding to the magnets. In this way, the coils are energized to change the magnetic field so as to drive the magnets to move, thereby driving the fixing bracket 1 and the first support frame 2 move.

In an embodiment, the flexible circuit board 6 is electrically connected to the shape memory wires 51 so as to control the shape memory wires 51.

In an embodiment, the flexible circuit board 6 is electrically connected to the shape memory wires 51. Accordingly, the shape memory wires 51 are energized or de-energized to control the corresponding shape memory wire 51 to drive the fixing bracket 1 to rotate relative to the first support frame 2 and the second support frame 3 about the first direction, or to control the corresponding shape memory wire 51 to drive the first support frame 2 to rotate relative to the second support frame 3.

In some embodiments, if the driving assembly 5 employs magnets and coils that match to each other, the flexible circuit board 6 can be electrically connected to the coils to energize or de-energize the coils, thereby controlling the magnetic field to drive the corresponding magnet.

In an embodiment, the first elastic support components 7 form an elastic connection between the fixing bracket 1 and the first support frame 2, and provide a rotation restoring force for the fixing bracket 1 to rotate relative to the first support frame 2 about the first direction.

In an embodiment, the first elastic support components 7 include two first elastic support components disposed in the first direction and spaced apart from each other. The two first elastic support components are respectively disposed on the first support frame 2 at the one pair of diagonal positions, and the two first elastic support components 7 each have a planar elastic sheet structure perpendicular to the optical axis.

In an embodiment, each of the first elastic support components 7 includes a first fixed arm 71 fixed at one corner of the fixing bracket 1, two second fixed arms 72 respectively fixed to two adjacent sides of the first support frame 2, and two first elastic arms 73 respectively configured to connect the two second fixed arms 72 with the first fixed arm 71.

In an embodiment, the second elastic support components 8 are configured to elastically connect the first support frame 2 and the second support frame 3, and provide a rotation restoring force for the first support frame 2 to rotate relative to the second support frame 3 about the second direction.

In an embodiment, the second elastic support components 8 include two second elastic support components that are spaced apart from each other in the second direction. The two second elastic support components 8 are disposed at the another pair of diagonal positions of the first support frame 2, respectively. The second elastic support components 8 each have a planar elastic sheet structure perpendicular to the optical axis.

In an embodiment, each of the two second elastic support components 8 includes a third fixed arm 81 fixed at one corner of the first support frame 2, two fourth fixed arms 82 fixed on the second support frame 3, and two second elastic arms 83 configured to connect the two fourth fixed arms 82 with the third fixed arm 81. The two fourth fixed arms 82 are fixed to two adjacent sides of the second support frame 3, respectively.

In an embodiment, the lens driving device further includes a shell 10 covering the second support frame 3 to protect internal components.

In an embodiment, the rotation assembly 4 includes two first rolling balls 41 and two second rolling balls 42. The rotation assembly can include one first rolling ball 41 and one second rolling ball 42 based on actual requirements. In an embodiment, one support wall 12 is provided and formed at one corner of the sidewall 11, and one first sliding groove 13 is provided and formed on the bottom surface of the support wall 12. The first support frame 2 is provided with one first avoidance groove 22 and one first support wall 24. The first avoidance groove 22 is formed at one corner of the top surfaces of the first sidewall 21, and the first support wall 24 is provided at another corner of the first sidewall 21. In an embodiment, one second sliding groove 23 is provided and formed at the bottom of the first avoidance groove 22, and one third sliding groove 25 is provided and formed on the bottom surface of the first support wall 24. The second sliding groove 23 and the third sliding groove 25 are respectively formed at two adjacent corners of the first sidewall 21. The second support frame 3 is provided with one second avoidance groove 32 that is formed at one corner of the top surface of the second sidewall 31, and one fourth sliding groove 33 is provided and formed at the bottom of the second avoidance groove 32. The first rolling ball 41 is clamped in the first sliding groove 13 and the second sliding groove 23, which are opposite to each other. In this way, the fixing bracket 1 is spaced apart from the first support frame 2 and is rotatably connected to each other around the first direction. The second rolling ball 42 is clamped in the third sliding groove 25 and the fourth sliding groove 33, which are opposite to each other. In this way, the first support frame 2 and the second support frame 3 are spaced apart from each other and are rotatably connected to each other around the second direction.

In the lens driving device of the present disclosure, the first sliding groove 13 is disposed at the corner of the bottom surface of the fixing bracket 1, the second sliding groove 23 is disposed at the corner of the top surface of the first support frame 2, the third sliding groove 25 is disposed at the corner of the bottom surface of the first support frame 2, and the fourth sliding groove 33 is provided at the corner of the top surface of the second support frame 3. The first rolling ball 41 of the rotation assembly 4 is clamped in the first sliding groove 13 and the second sliding groove 23 that are opposite to each other. Compared with the related art, the fixing bracket 1 and the first support frame 2 are spaced apart from each other and are rotatably connected around the first direction. The second rolling ball 42 of the rotation assembly 4 is clamped in the third sliding groove 25 and the fourth sliding groove 33 so that the first support frame 2 and the second support frame 3 are spaced apart from each other and rotatably connected around the second direction. In this way, a floating rotational connection of double-layer nested rolling balls is formed among the fixing bracket 1, the first support frame 2, and the second support frame 3, thereby reducing the size change in the height direction during the rotation of the lens module 9. Accordingly, the requirement in the height direction of the overall structure is also reduced, and the height of the lens driving device is greatly reduced.

The above merely illustrates some embodiments of the present disclosure. It should be noted that those skilled in the art can make improvements without departing from the concept of the present disclosure, which are all included within the scope of the present disclosure.

What is claimed is:

1. A lens driving device, comprising:
   a fixing bracket having a rectangular structure with a receiving space, the receiving space being configured to install a lens module;
   a first support frame having a rectangular structure and sleeved on an outer periphery of the fixing bracket, the first support frame being spaced apart from the fixing bracket;
   a second support frame having a rectangular structure and sleeved on an outer periphery of the first support frame, the second support frame being spaced apart from the first support frame;
   a rotation assembly comprising at least one first rolling ball and at least one second rolling ball;
   a driving assembly comprising at least two shape memory wires;
   a flexible circuit board electrically connected to the at least two shape memory wires;
   at least one first elastic support component configured to elastically connect the fixing bracket with the first support frame and providing a rotation restoring force for the fixing bracket to rotate relative to the first support frame about a first direction; and
   at least one second elastic support component configured to elastically connect the first support frame with the second support frame and providing a rotation restoring force for the first support frame to rotate relative to the second support frame about a second direction,
   wherein at least one first sliding groove is provided at a bottom surface of the fixing bracket and formed at a corner of the fixing bracket, at least one second sliding groove is provided at a top surface of the first support frame, at least one third sliding groove is provided at a bottom surface of the first support frame, the at least one second sliding groove and the at least one third sliding groove are respectively formed at two adjacent corners of the first support frame, and at least one fourth sliding groove is provided at a top surface of the second support frame and formed at a corner of the second support frame;
   wherein each of the at least one first rolling ball is clamped in one of the at least one first sliding groove and one of the at least one second sliding groove that are opposite to each other, in such a manner that the fixing bracket and the first support frame are spaced apart from each other and are rotatably connected to each other around the first direction;
   wherein each of the at least one second rolling ball is clamped in one of the at least one third sliding groove and one of the at least one fourth sliding groove that are opposite to each other, in such a manner that the first support frame and the second support frame are spaced apart from each other and are rotatably connected to each other around the second direction, wherein the first direction and the second direction are both perpendicular to an optical axis of the lens module, and are parallel to two diagonal directions of the fixing bracket;
   wherein one of the at least two shape memory wires is connected between the second support frame and the fixing bracket, and is configured to drive the fixing bracket to rotate relative to the first support frame and the second support frame about the first direction; and
   wherein another one of the at least two shape memory wires is connected between the second support frame and the first support frame, and is configured to drive the first support frame to rotate relative to the second support frame about the second direction.

2. The lens driving device as described in claim 1, wherein each of the at least one first sliding groove and the at least one second sliding groove is a V-shaped structural groove.

3. The lens driving device as described in claim 1, wherein each of the at least one third sliding groove and the at least one fourth sliding groove is a V-shaped structural groove.

4. The lens driving device as described in claim 1, wherein the at least one first rolling ball comprises two first rolling balls; the at least one first sliding groove comprises two first sliding grooves that are respectively formed at one pair of diagonal positions of the bottom surface of the fixing bracket; and the at least one second sliding groove comprises two second sliding grooves that are respectively formed at one pair of diagonal positions of the top surface of the first support frame.

5. The lens driving device as described in claim 4, wherein the at least one second rolling ball comprises two second rolling balls;
   the at least one third sliding groove comprises two third sliding grooves that are respectively formed at another pair of diagonal positions of the bottom surface of the first support frame; and
   the at least one fourth sliding groove comprises two fourth sliding grooves that are respectively formed at another pair of diagonal positions of the top surface of the second support frame.

6. The lens driving device as described in claim 5, wherein the first support frame comprises a first sidewall surrounding the fixing bracket, and two first support walls extending outwards from the first sidewall, wherein the two first support walls are formed at another pair of diagonal positions of the first sidewall, respectively;
   the two third sliding grooves are formed at bottom surfaces of the two first support walls, respectively;
   the second support frame is provided with two second avoidance grooves that are respectively formed at one pair of diagonal positions of the second support frame, and the two fourth sliding grooves are formed at bottoms of the two second avoidance grooves; and
   the two first support walls extend into the two second avoidance grooves, respectively.

7. The lens driving device as described in claim 4, wherein the fixing bracket comprises a sidewall surrounding the lens module and two support walls extending outwards from the sidewall, wherein the two support walls are respectively formed at one pair of diagonal positions of the sidewall, and the two first sliding grooves are formed at bottom surfaces of the two support walls, respectively;
   the first support frame is provided with two first avoidance grooves, wherein the two first avoidance grooves are respectively recessed at one pair of diagonal positions of the first support frame, and the two second sliding grooves are formed at bottoms of the two first avoidances grooves, respectively; and
   the two support walls extend into the two first avoidance grooves, respectively.

8. The lens driving device as described in claim 7, wherein the at least one second rolling ball comprises two second rolling balls;
   the at least one third sliding groove comprises two third sliding grooves that are respectively formed at another pair of diagonal positions of the bottom surface of the first support frame; and
   the at least one fourth sliding groove comprises two fourth sliding grooves that are respectively formed at another pair of diagonal positions of the top surface of the second support frame.

9. The lens driving device as described in claim 8, wherein the first support frame comprises a first sidewall surrounding the fixing bracket, and two first support walls extending outwards from the first sidewall, wherein the two first support walls are formed at another pair of diagonal positions of the first sidewall, respectively;
   the two third sliding grooves are formed on bottom surfaces of the two first support walls, respectively;
   the second support frame is provided with two second avoidance grooves that are respectively recessed at one pair of diagonal positions the second support frame, and the two fourth sliding grooves are formed at bottoms of the two second avoidance grooves; and
   the two first support walls extend into the two second avoidance grooves, respectively.

10. The lens driving device as described in claim 1, wherein the at least one first elastic support component comprises two first elastic support components that are spaced apart from each other in the first direction, wherein the two first elastic support components are respectively disposed at one pair of diagonal positions of the first support frame, and each of the two first elastic support components has a planar elastic sheet structure perpendicular to the optical axis.

11. The lens driving device as described in claim 10, wherein each of the two first elastic support components comprises:
   a first fixed arm fixed at a corner of the fixing bracket;
   two second fixed arms respectively fixed to two adjacent sides of the first support frame; and
   two first elastic arms respectively configured to connect the two second fixed arms with the first fixed arm.

12. The lens driving device as described in claim 10, wherein the at least one second elastic support component comprises two second elastic support components that are spaced apart from each other in the second direction, wherein the two second elastic support components are respectively disposed at another pair of diagonal positions of the first support frame, and each of the two second elastic support components has a planar elastic sheet structure perpendicular to the optical axis.

13. The lens driving device as described in claim 12, wherein each of the two second elastic support components comprises:
   a third fixed arm fixed at a corner of the first support frame;
   two fourth fixed arms respectively fixed to two adjacent sides of the second support frame; and
   two second elastic arms respectively configured to connect the two fourth fixed arms with the third fixed arm.

14. The lens driving device as described in claim 1, further comprising:
   a shell covering the second support frame.

* * * * *